(12) United States Patent
Nagao

(10) Patent No.: US 9,710,311 B2
(45) Date of Patent: Jul. 18, 2017

(54) INFORMATION PROCESSING SYSTEM, METHOD OF CONTROLLING INFORMATION PROCESSING SYSTEM, AND RECORDING MEDIUM

(71) Applicant: FUJITSU LIMITED, Kawasaki-shi, Kanagawa (JP)

(72) Inventor: Takuya Nagao, Nagoya (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 14/331,594

(22) Filed: Jul. 15, 2014

(65) Prior Publication Data
US 2015/0089507 A1    Mar. 26, 2015

(30) Foreign Application Priority Data

Sep. 25, 2013 (JP) ................................. 2013-198140

(51) Int. Cl.
*G06F 9/48* (2006.01)
*H04L 12/24* (2006.01)
(Continued)

(52) U.S. Cl.
CPC ............ *G06F 9/505* (2013.01); *G06F 9/5027* (2013.01); *G06F 9/5072* (2013.01); *G06F 9/485* (2013.01); *G06F 11/3404* (2013.01)

(58) Field of Classification Search
CPC ........... G06F 2009/4441; G06F 9/5072; G06F 9/4881; G06F 9/5066; G06F 9/5027
See application file for complete search history.

(56) References Cited

U.S. PATENT DOCUMENTS 7,565,657 B1 *   7/2009   Leung et al. .................. 718/104
9,329,909 B1 *   5/2016   Khanna .................. G06F 9/5072
(Continued)

FOREIGN PATENT DOCUMENTS

JP    07-249010    9/1995
JP    08-314736    11/1996
(Continued)

OTHER PUBLICATIONS

Bani-Mohammad, Saad et al. "A performance comparison of the contiguous allocation strategies in 3D mesh connected multicomputers." 2007. Parallel and Distributed Processing and Applications. Springer Berlin Heidelberg. p. 645-656.*

(Continued)

*Primary Examiner* — Lewis A Bullock, Jr.
*Assistant Examiner* — Gilles Kepnang
(74) *Attorney, Agent, or Firm* — Staas & Halsey LLP

(57) ABSTRACT

An information processing system includes a plurality of information processing apparatuses, a management apparatus including a first processor, and configured to manage execution of jobs by the plurality of information processing apparatuses; and a terminal apparatus including a second processor. The first processor is configured to identify an information processing apparatus not executing a job among the plurality of information processing apparatuses, transmit information on the number of identified information processing apparatuses, and upon receiving identification information on at least one job to be executed on the information processing apparatus not executing a job from the terminal apparatus, perform scheduling so that the information processing apparatus not executing a job executes the job.

20 Claims, 16 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 2004/0193461 A1* | 9/2004 | Keohane | G06Q 10/06 705/1.1 |
| 2005/0071843 A1* | 3/2005 | Guo | G06F 9/505 718/101 |
| 2005/0235286 A1* | 10/2005 | Ballew et al. | 718/100 |
| 2006/0017954 A1* | 1/2006 | Ly et al. | 358/1.13 |
| 2006/0168584 A1* | 7/2006 | Dawson | G06F 9/5072 718/104 |
| 2007/0143760 A1* | 6/2007 | Chan | G06F 9/4881 718/102 |
| 2008/0256549 A1* | 10/2008 | Liu | G06F 9/4881 718/106 |
| 2008/0294872 A1* | 11/2008 | Bryant | G06F 9/5027 712/28 |
| 2009/0031316 A1* | 1/2009 | Richoux | G06F 9/5066 718/102 |
| 2010/0115526 A1* | 5/2010 | Mincarelli | G06F 9/485 718/104 |
| 2010/0293551 A1* | 11/2010 | Ajima et al. | 718/104 |
| 2011/0067030 A1* | 3/2011 | Isard | G06F 8/433 718/102 |
| 2012/0198470 A1* | 8/2012 | Albing | G06F 9/5066 718/105 |
| 2013/0152089 A1 | 6/2013 | Shimamura | |
| 2013/0290953 A1* | 10/2013 | Li | G06F 9/5066 718/1 |
| 2013/0311998 A1* | 11/2013 | Davidson et al. | 718/103 |

FOREIGN PATENT DOCUMENTS

| | | |
|---|---|---|
| JP | 2005-310139 | 11/2005 |
| WO | 2012/020474 A1 | 2/2012 |

OTHER PUBLICATIONS

Japanese Office Action mailed May 2, 2017 in related Japanese Application No. 2013-198140.

\* cited by examiner

FIG. 4

| JOB | THE NUMBER OF COMPUTATION NODES | DIMENSION |
|---|---|---|
| JOB A | 200 | 3 |
| JOB B | 100 | 3 |
| JOB C | 150 | 3 |
| ⋮ | ⋮ | ⋮ |

FIG. 5

| COMPUTATION NODE | ... | TIME | | | | | |
|---|---|---|---|---|---|---|---|
| | | $t_{n-2}$ | $t_{n-1}$ | $t_n$ | $t_{n+1}$ | $t_{n+2}$ | ... |
| COMPUTATION NODE 1 | ... | JOB C | JOB C | JOB C | JOB C | JOB C | ... |
| COMPUTATION NODE 2 | ... | JOB A | JOB A | JOB A | JOB B | JOB B | ... |
| COMPUTATION NODE 3 | ... | JOB A | JOB A | JOB A | JOB B | JOB B | ... |
| ... | | ... | ... | ... | ... | ... | ... |

FIG. 6

| ORIGIN COORDINATES (X-AXIS, Y-AXIS, Z-AXIS) | (X-AXIS SIZE, Y-AXIS SIZE, Z-AXIS SIZE) |
|---|---|
| 0,0,0 | 1,1,1 |
| 0,0,0 | 1,1,2 |
| ⋮ | ⋮ |
| 0,0,0 | 16,16,16 |
| ⋮ | ⋮ |
| 8,8,8 | 50,50,50 |
| ⋮ | ⋮ |

INFORMATION PROCESSING SYSTEM, METHOD OF CONTROLLING INFORMATION PROCESSING SYSTEM, AND RECORDING MEDIUM

CROSS-REFERENCE TO RELATED APPLICATION

This application is based upon and claims the benefit of priority of the prior Japanese Patent Application No. 2013-198140, filed on Sep. 25, 2013, the entire contents of which are incorporated herein by reference.

FIELD

The embodiments discussed herein are related to an information processing system, a method of controlling an information processing system, and a recording medium.

BACKGROUND

In parallel computers (for example, a supercomputer) that are jointly used by a plurality of users, if job execution instructions from the users are concentrated in a specific time slot, computational resources become insufficient, and thus it becomes difficult to execute jobs. Thus, in related-art techniques, a scheduler is provided in a system that manages a parallel computer, and a job execution schedule is managed by the scheduler in order to avoid a shortage of computational resources during the execution of jobs.

However, a job that is not scheduled for execution in advance, but is to be urgently executed sometimes occurs in a real operation. For example, if a disaster occurs, a user has to urgently perform a job for predicting the impact of the disaster in order to take measures against the disaster.

In the above-described technique, if the scheduler receives a new job to be executed, the scheduler identifies a CPU having a free memory space larger than the amount of memory used by the job from a plurality of CPUs, and causes the identified CPU to execute the job. However, in this method, a free memory space is managed for each CPU, and thus scheduling is sometimes performed such that the computing power of the CPUs is not fully utilized.

As an example of a related-art technical document, Japanese Laid-open Patent Publication No. 7-249010 is known.

SUMMARY

According to an aspect of the invention, an information processing system includes a plurality of information processing apparatuses, a management apparatus including a first processor, and configured to manage execution of jobs by the plurality of information processing apparatuses; and a terminal apparatus including a second processor. The first processor is configured to identify an information processing apparatus not executing a job among the plurality of information processing apparatuses, transmit information on the number of identified information processing apparatuses, and upon receiving identification information on at least one job to be executed on the information processing apparatus not executing a job from the terminal apparatus, perform scheduling so that the information processing apparatus not executing a job executes the job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of data stored in a job data storage unit;
FIG. 5 illustrates an example of data stored in a schedule data storage unit;
FIG. 6 illustrates an example of a free space list stored in a resource data storage unit.

DESCRIPTION OF EMBODIMENTS

With an embodiment of the present disclosure, it is desirable to provide a technique for effectively using computational resources of a parallel computer that executes jobs.

Figure 1:
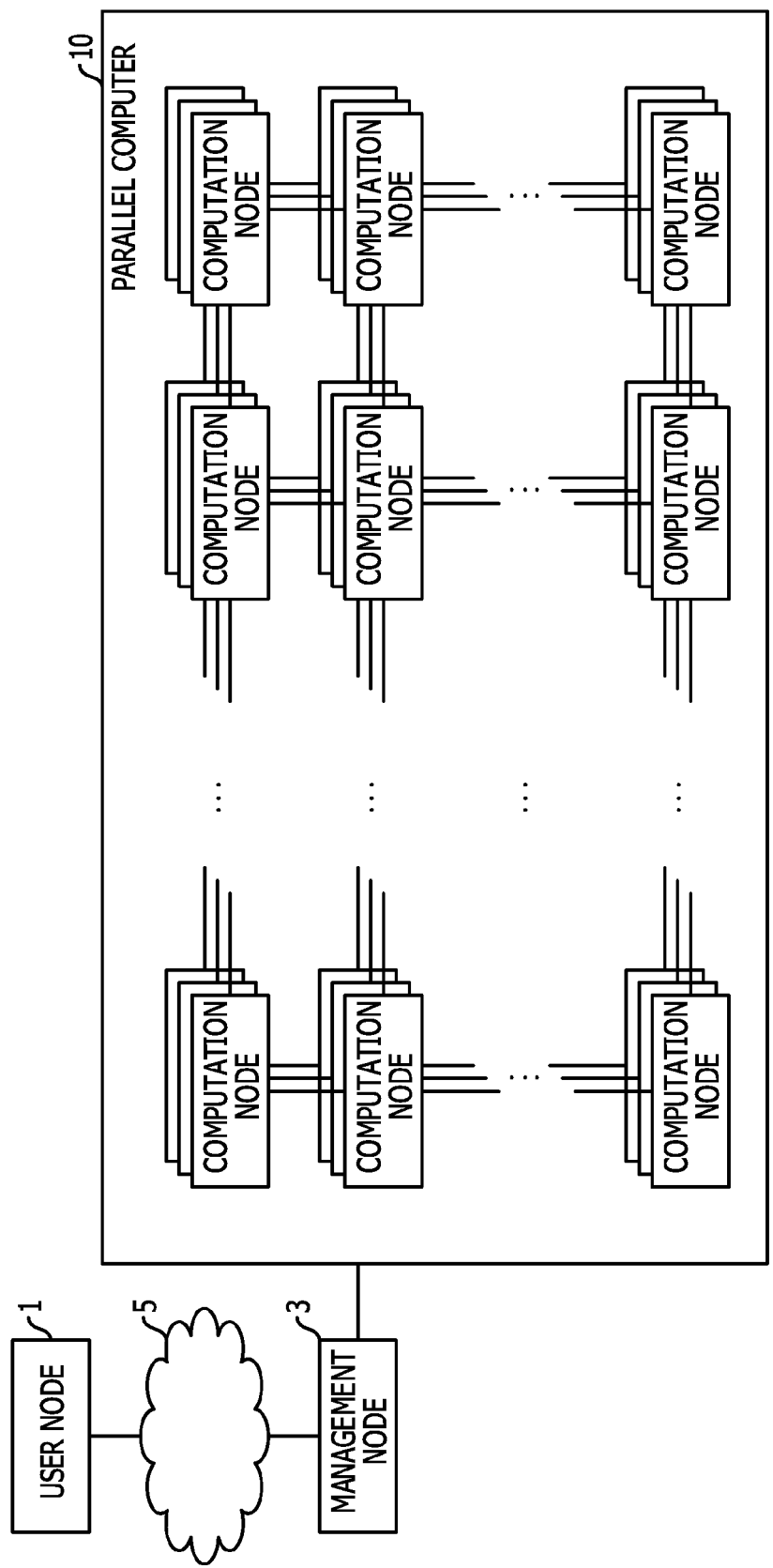
FIG. 1 illustrates an overview of a system according to the present embodiment.

FIG. 1 illustrates an overview of a system according to the present embodiment. A user node 1, which is operated by a user, and a management node 3 are coupled to a network 5, which is the Internet, for example. The management node 3 manages a plurality of computation nodes, which operate as a parallel computer 10. The user node 1 transmits a job execution request to the management node 3. The management node 3 performs scheduling of a job specified by the execution request, and causes the computation nodes to execute jobs in accordance with the schedule. The parallel computer 10 is capable of executing a plurality of jobs in parallel.

Figure 2:
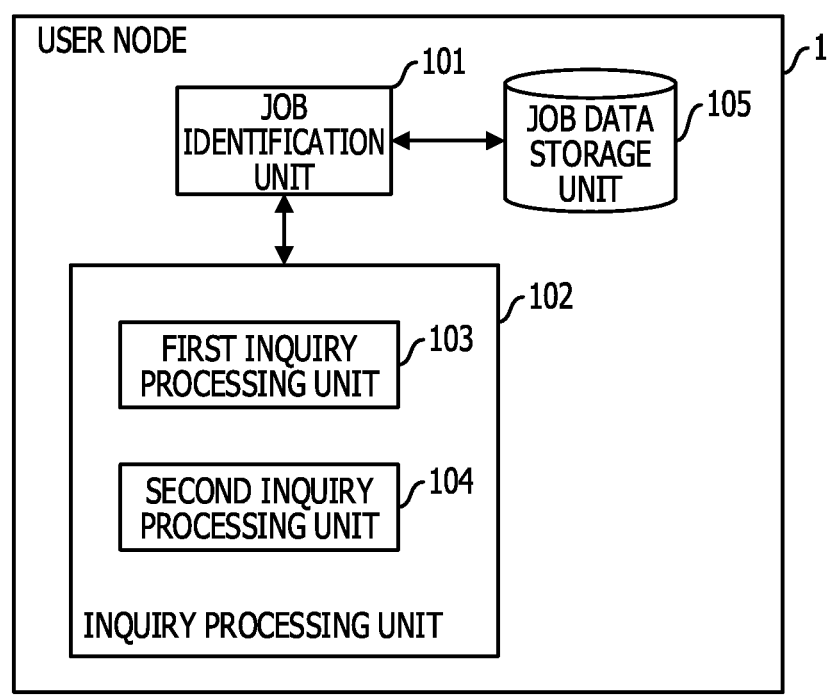
FIG. 2 is a functional block diagram of a user node.

FIG. 2 illustrates a functional block diagram of the user node 1. The user node 1 includes a job identification unit 101, an inquiry processing unit 102 including a first inquiry processing unit 103 and a second inquiry processing unit 104, and a job data storage unit 105.

The job identification unit 101 executes processing for identifying a job to be executed using data stored in the job data storage unit 105, and outputs a processing result to the inquiry processing unit 102. The first inquiry processing unit 103 executes processing for inquiring as to the number of computation nodes that are not executing a job (that is to say, empty nodes) out of the computation nodes in the parallel computer 10 from the management node 3, and receives a response to the inquiry from the management node 3. The second inquiry processing unit 104 transmits an execution request that requests execution of a job, and a stop request that requests stopping of a job to the management node 3 based on a processing result obtained by the job identification unit 101.

Figure 3:
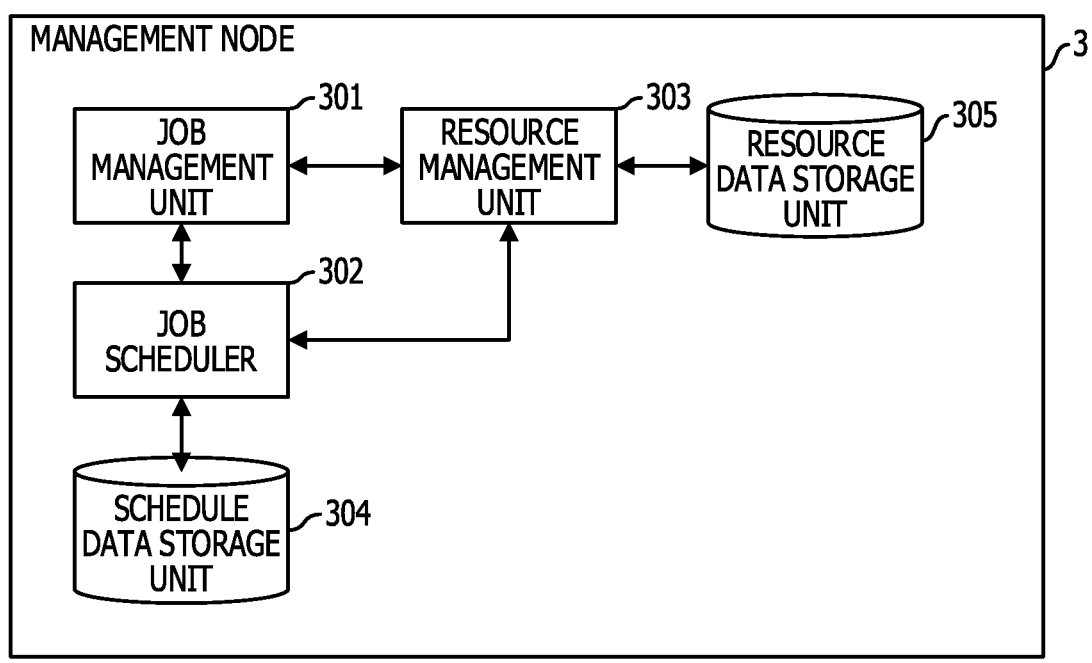
FIG. 3 is a functional block diagram of a management node.

FIG. 3 illustrates a functional block diagram of the management node 3. The management node 3 includes a job management unit 301, a job scheduler 302, a resource management unit 303, a schedule data storage unit 304, and a resource data storage unit 305.

When the job management unit 301 receives an execution request from the user node 1, the job management unit 301 outputs a job execution request to the job scheduler 302. Also, when the job management unit 301 receives an inquiry regarding the number of empty computation nodes from the user node 1, the job management unit 301 outputs the inquiry to the resource management unit 303. The job scheduler 302 generates an execution schedule of the job specified by the execution request, and stores the execution schedule in the schedule data storage unit 304. The resource management unit 303 executes processing for allocating jobs to the computation nodes in accordance with the execution schedule using the data stored in the schedule data storage unit 304. Also, the resource management unit 303 calculates a maximum free space described later using the data stored in the resource data storage unit 305, and outputs information on the calculated maximum free space to the job management unit 301.

FIG. 4 illustrates an example of data stored in the job data storage unit 105 of the user node 1. In the example in FIG. 4, identification information of a job, the number of computation nodes used for executing the job, and a number that indicates the number of dimensions are stored. The number that indicates the number of dimensions determines a spatial shape formed by the computation nodes to be used for executing a job. If the number is "2", the spatial shape formed by the computation nodes is planar. If the number is "3", the spatial shape formed by the computation nodes is cuboid. In this regard, if the number is "1", there is no restriction on the shape formed by the computation nodes used for executing a job. If the number is "1", the computation nodes may be discrete. However, if the computation nodes are discrete, a communication load sometimes occurs at a computation node having no relationship with the execution of a job. Accordingly, it is desirable that the computation nodes are not discrete.

FIG. 5 illustrates an example of data stored in the schedule data storage unit 304 of the management node 3. In the example in FIG. 5, a job execution schedule is stored for each computation node. For example, the computation node 2 executes a jobA at time $t_{n-2}$, at time $t_{n-1}$, and at time $t_n$, and executes a jobB at time $t_{n+1}$, and at time $t_{n+2}$.

FIG. 6 illustrates an example of a free space list stored in the resource data storage unit 305. In the example in FIG. 6, coordinates of the origin in space, and sizes in the directions of the individual coordinate axes are stored. The data stored in the resource data storage unit 305 is generated by the resource management unit 303. The resource management unit 303 receives information indicating the state of the computation nodes periodically, for example, and identifies a computation node that is not executing a job. And the resource management unit 303 calculates a free space, which is a space occupied by the computation node that is not executing a job, and records the free space in the free space list.

Next, a description will be given of processing performed by the system illustrated in FIG. 1 with reference to FIG. 7 to FIG. 15. First, a description will be given of processing performed by the management node 3 with reference to FIG. 7 to FIG. 11.

Figure 7:
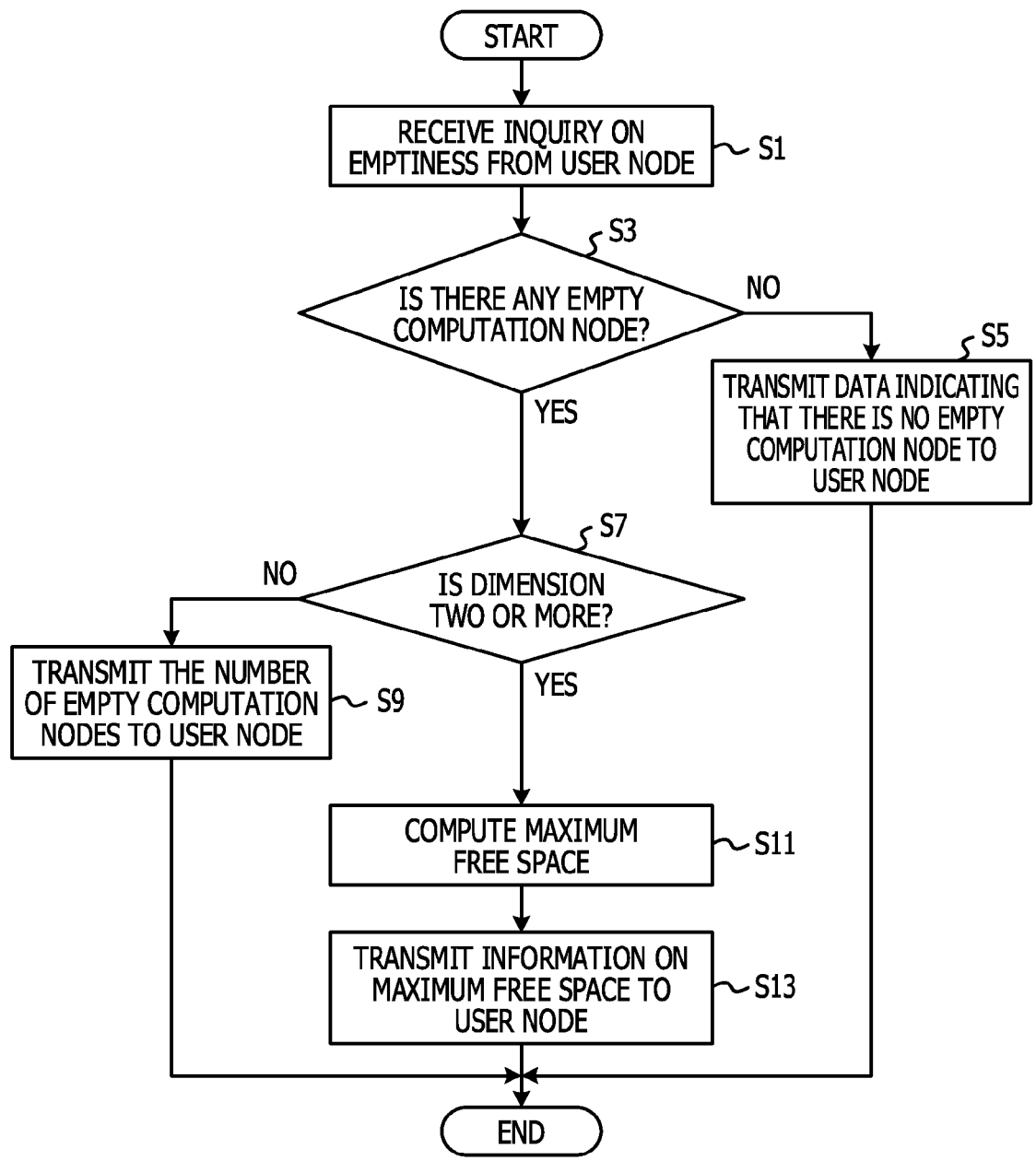
FIG. 7 illustrates a flowchart of processing executed by the management node.

First, the job management unit 301 in the management node 3 receives an inquiry regarding the emptiness of the computation nodes in the parallel computer 10 from the user node 1 (FIG. 7: step S1). The inquiry regarding the emptiness includes the number indicating the number of dimensions. The job management unit 301 outputs the received inquiry to the resource management unit 303.

The resource management unit 303 determines whether there is any empty computation node in the parallel computer 10 (step S3). In step S3, the resource management unit 303 makes the determination by checking whether a free space is recorded in the free space list stored in the resource data storage unit 305 or not.

If there is no empty computation node (step S3: No route), the resource management unit 303 transmits data indicating that there is no empty computation node to the user node 1 (step S5). In this regard, after the processing in step S5, the resource management unit 303 may stop at least some of the jobs being executed in the parallel computer 10, and may obtain free computational resources.

On the other hand, if there is an empty computation node (step S3: Yes route), the resource management unit 303 determines whether the number indicating the number of dimensions, which is included in the inquiry, is two or more (step S7).

If the number indicating the number of dimensions is not two or more (that is to say, one) (step S7: No route), the resource management unit 303 transmits the number of empty computation nodes to the user node 1 (step S9). Then, the processing is terminated.

On the other hand, if the number indicating the number of dimensions is two or more (step S7: Yes route), the resource management unit 303 calculates a maximum free space (step S11). The maximum free space is a free space having the maximum volume among the free spaces recorded in the free space list.

Figure 8:
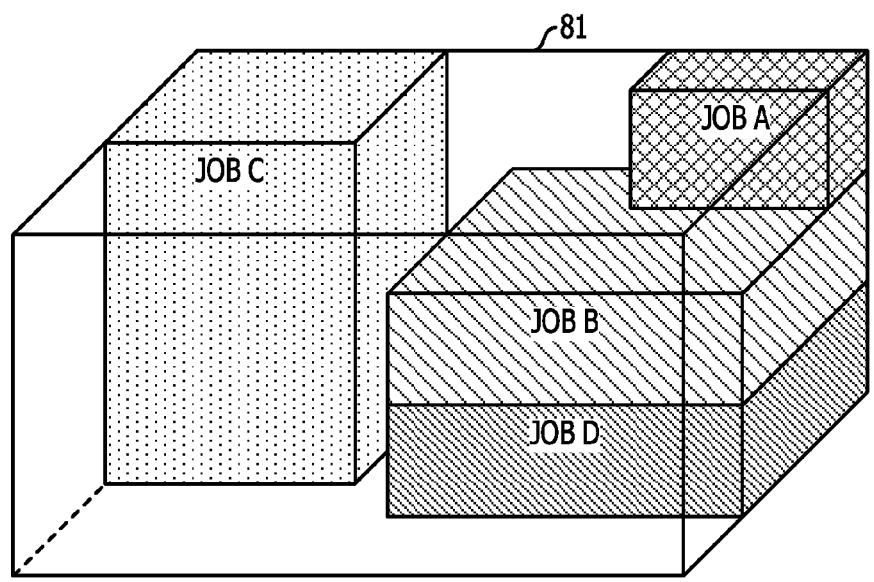
FIG. 8 illustrates a space occupied by all the computation nodes, and spaces occupied by computation nodes in execution of jobs.

FIG. 8 illustrates a space occupied by all the computation nodes, and spaces occupied by jobs being executed in the parallel computer 10. In the example in FIG. 8, a cuboid 81 is a space occupied by the computation nodes in the parallel computer 10, and patterned blocks are spaces occupied by the computation nodes in execution of jobs, respectively. If the number of dimensions is three, as illustrated in FIG. 8, the computation nodes are allocated to jobs such that spaces formed by the computation nodes executing jobs become cuboids, respectively. This is because if the computation nodes executing jobs are discrete, at a time when communication is being performed between the discrete computation nodes, a communication processing load sometimes occurs on a computation node that is not executing a job.

A description will be given of the maximum free space with reference to FIG. 9. In the example in FIG. 9, a jobE and a jobF are being executed, and a space other than those of the jobs is a space occupied by the computation nodes that are not executing jobs. The maximum free space is a space occupied by a cuboid having a maximum volume in a space occupied by the computation nodes that are not executing jobs. Accordingly, in the example in FIG. 9, a space occupied by a dotted block 91 is the maximum free space. By identifying the maximum free space, it becomes possible to utilize empty computation nodes as efficiently as possible.

Referring back to FIG. 7, the resource management unit 303 transmits information on the maximum free space (the number of the computation nodes included in the maximum free space in the present embodiment) to the user node 1 (step S13). Then, the processing is terminated.

By performing the processing as described above, it becomes possible for the user node 1 to select a suitable job in accordance with the number of empty computation nodes.

Next, a description will be given of processing executed when the management node 3 has received a request (here, an execution request or a stop request) from the user node 1 with reference to FIG. 10.

Figure 10:
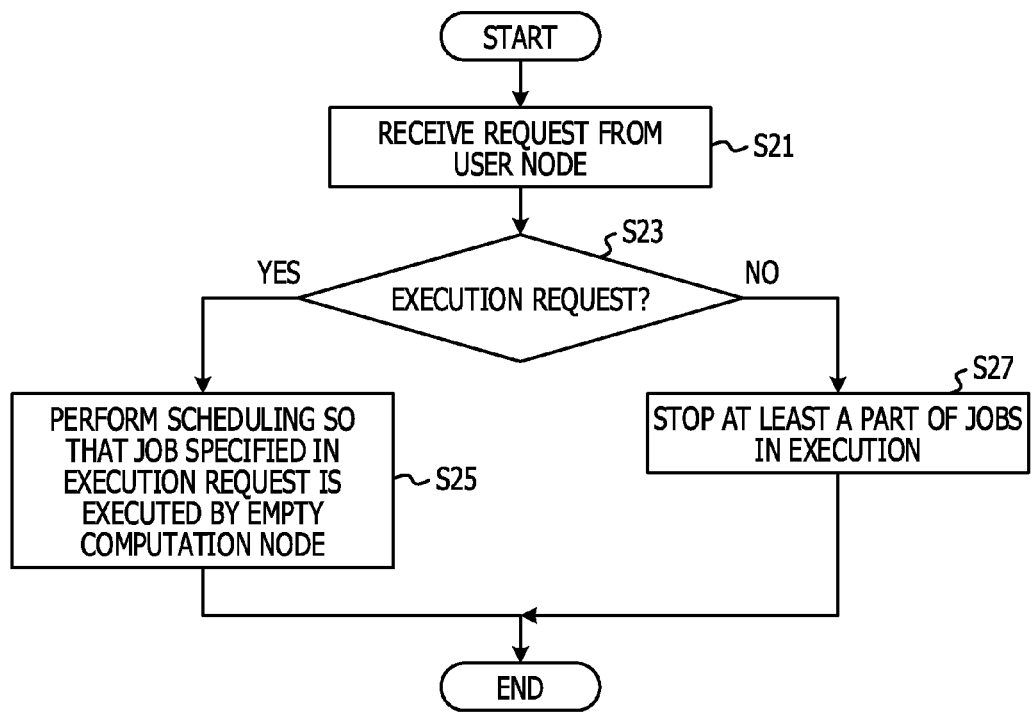
FIG. 10 illustrates a flowchart of processing executed by the management node.

First, the job management unit 301 in the management node 3 receives a request from the user node 1 (FIG. 10: step S21).

The job management unit 301 determines whether the request received in step S21 is an execution request that requests execution of a job (step S23). The execution request includes identification information of the job specified by the user node 1.

If the request is an execution request (step S23: Yes route), the job management unit 301 outputs the execution request to the job scheduler 302. The job scheduler 302 performs scheduling so as to execute the job specified in the execution request by the empty computation node in response to this (step S25).

On the other hand, if the request is not an execution request (step S23: No route), the request received in step S21 is a stop request that requests the job to stop, and thus the job management unit 301 outputs the stop request to the resource management unit 303. The resource management unit 303 stops at least a part of the jobs in execution in the parallel computer 10 (step S27). Then, the processing is terminated.

By performing the above-described processing, if it is possible to secure sufficient free space to execute a job, it becomes possible to execute a job specified from the user node 1 to be urgently executed (hereinafter referred to as an urgent job), or the like without stopping a job being executed.

In the case of stopping a job that is being executed, the context of the job, and the like are stored in a hard disk, or the like, and after an urgent job is completed, the context is restored to restart the job. Accordingly, processing that did not have to be performed originally (that is to say, an overhead) occurs. However, by performing the processing in step S25 in the present embodiment, the overhead does not occur.

Also, by stopping jobs being executed, more computational resources are sometimes obtained than the computational resources that will be used for an urgent job. In that case, unused computational resources are wasted. However, by using the method according to the present embodiment, such waste does not occur.

Also, even if it is not possible to secure a sufficient free space to execute the job, by enlarging the free space by the processing in step S27, it becomes possible to execute the urgent job.

Figure 9:
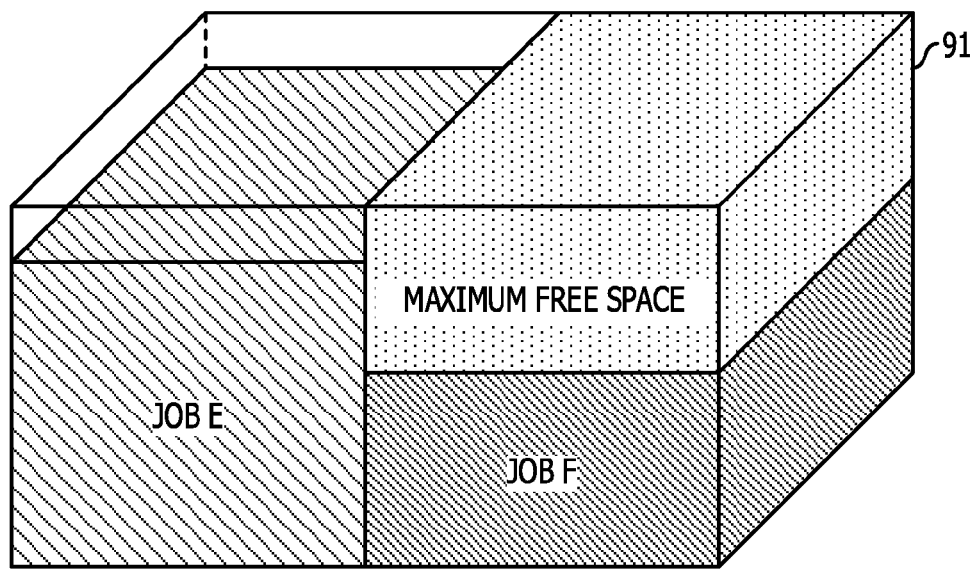
FIG. 9 is a diagram for explaining a maximum free space.
Figure 11:
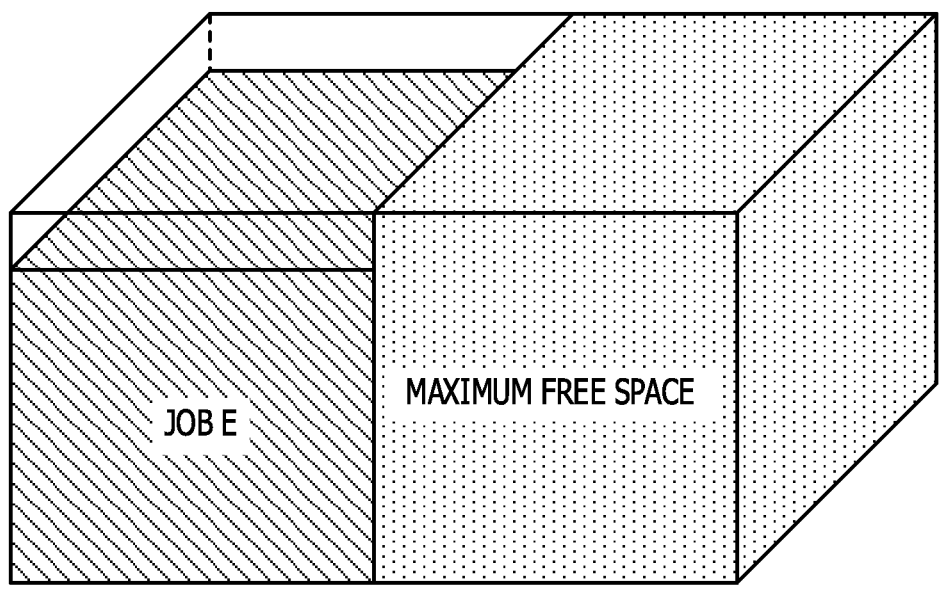
FIG. 11 is a diagram for explaining a maximum free space.

In this regard, for example, if the jobF is stopped in the example in FIG. 9, the maximum free space is increased as illustrated in FIG. 11. In FIG. 11, the space occupied by the computation node that executes the job F is added to the maximum free space. By enlarging the maximum free space in this manner, it becomes possible to execute a larger number of urgent jobs, for example.

Next, a description will be given of processing executed by the user node 1 with reference to FIG. 12 to FIG. 14. Here, it is assumed that a plurality of urgent jobs have occurred.

Figure 12:
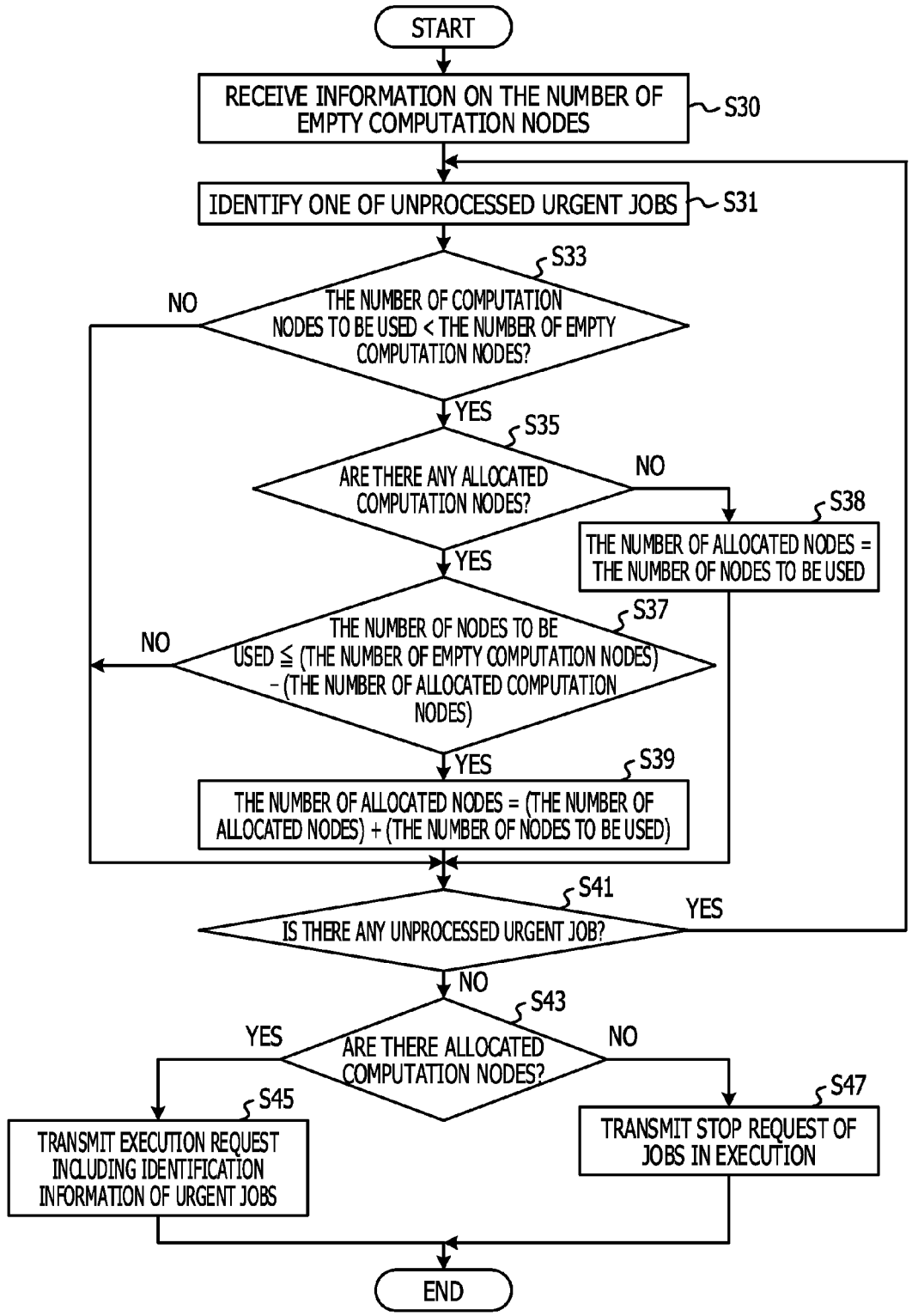
FIG. 12 illustrates a flowchart of processing executed by the user node.

First, the first inquiry processing unit 103 in the user node 1 receives information on the number of empty computation nodes, which has been transmitted from the management node 3 by the processing in step S9 and step S13 (FIG. 12: step S30). The first inquiry processing unit 103 outputs the received information to the job identification unit 101.

The job identification unit 101 identifies one of unprocessed urgent jobs out of the plurality of urgent jobs (step S31).

The job identification unit 101 identifies the number of computation nodes to be used for the identified urgent job from the job data storage unit 105. Then, the job identification unit 101 determines whether the number of computation nodes to be used for the urgent job is less than the number of empty computation nodes (step S33).

If the number of computation nodes to be used for the urgent job is equal to or more than the number of empty computation nodes (step S33: No route), it is not possible to allocate computation nodes to that urgent job, and thus the processing proceeds to the processing in step S41. On the other hand, if the number of computation nodes to be used for the urgent job is less than the number of empty computation nodes (step S33: Yes route), the job identification unit 101 determines whether there are any allocated computation nodes or not (step S35). An allocated computation node is a computation node that has already been determined to be allocated to an urgent job out of empty computation nodes.

If there are no allocated computation nodes (step S35: No route), in order to allocate a computation node to the identified urgent job in step S31, the job identification unit 101 sets the number of allocated computation nodes to the same number as that of the number of computation nodes to be used for the urgent job (step S38), and the processing proceeds to the processing in step S41. On the other hand, if there is an allocated computation node (step S35: Yes route), the job identification unit 101 determines whether the number of computation nodes to be used for the urgent job is equal to or less than the difference when the number of allocated computation nodes is subtracted from the number of empty computation nodes (step S37). That is to say, a determination is made as to whether there is a computation node that is allowed to be allocated to the identified urgent job in step S31 or not.

If the number of computation nodes to be used for the urgent job is larger than the difference when the number of allocated computation nodes is subtracted from the number of empty computation nodes (step S37: No route), it is not possible to allocate a computation node to the identified urgent job in step S31, and thus the processing proceeds to step S41. On the other hand, if the number of computation nodes to be used for the urgent job is equal to or less than the difference when the number of allocated computation nodes is subtracted from the number of empty computation nodes (step S37: Yes route), the job identification unit 101 sets the number of allocated computation nodes to the sum of the number of computation nodes to be used for the urgent job and the number of allocated nodes (step S39).

The job identification unit 101 determines whether there are any unprocessed urgent jobs or not (step S41). If there is an unprocessed urgent job (step S41: Yes route), the processing returns to the processing in step S31 in order to perform processing on the next urgent job.

On the other hand, if there are no unprocessed urgent jobs (step S41: No route), the job identification unit 101 determines whether there are allocated computation nodes or not (step S43).

If there are allocated computation nodes (step S43: Yes route), the job identification unit 101 outputs the identification information of the urgent job to which the computation node is allocated to the second inquiry processing unit 104. In response to this, the second inquiry processing unit 104 transmits an execution request including the identification information of the urgent job received from the job identification unit 101 to the management node 3 (step S45). Then, the processing is terminated.

On the other hand, if there are no allocated computation nodes (step S43: No route), there are not sufficient number of computation nodes for the execution of the urgent job. Thus, the second inquiry processing unit 104 transmits a stop request that requests stopping of at least some of jobs being executed in the parallel computer 10 to the management node 3 (step S47). Then, the processing is terminated.

By performing the processing described above, it is possible to execute suitable jobs in accordance with the number of computation nodes that are not executing a job, and thus it becomes possible to effectively utilize the surplus computational resources in the parallel computer 10. As a result, the throughput of the parallel computer 10 is improved.

Figure 13:
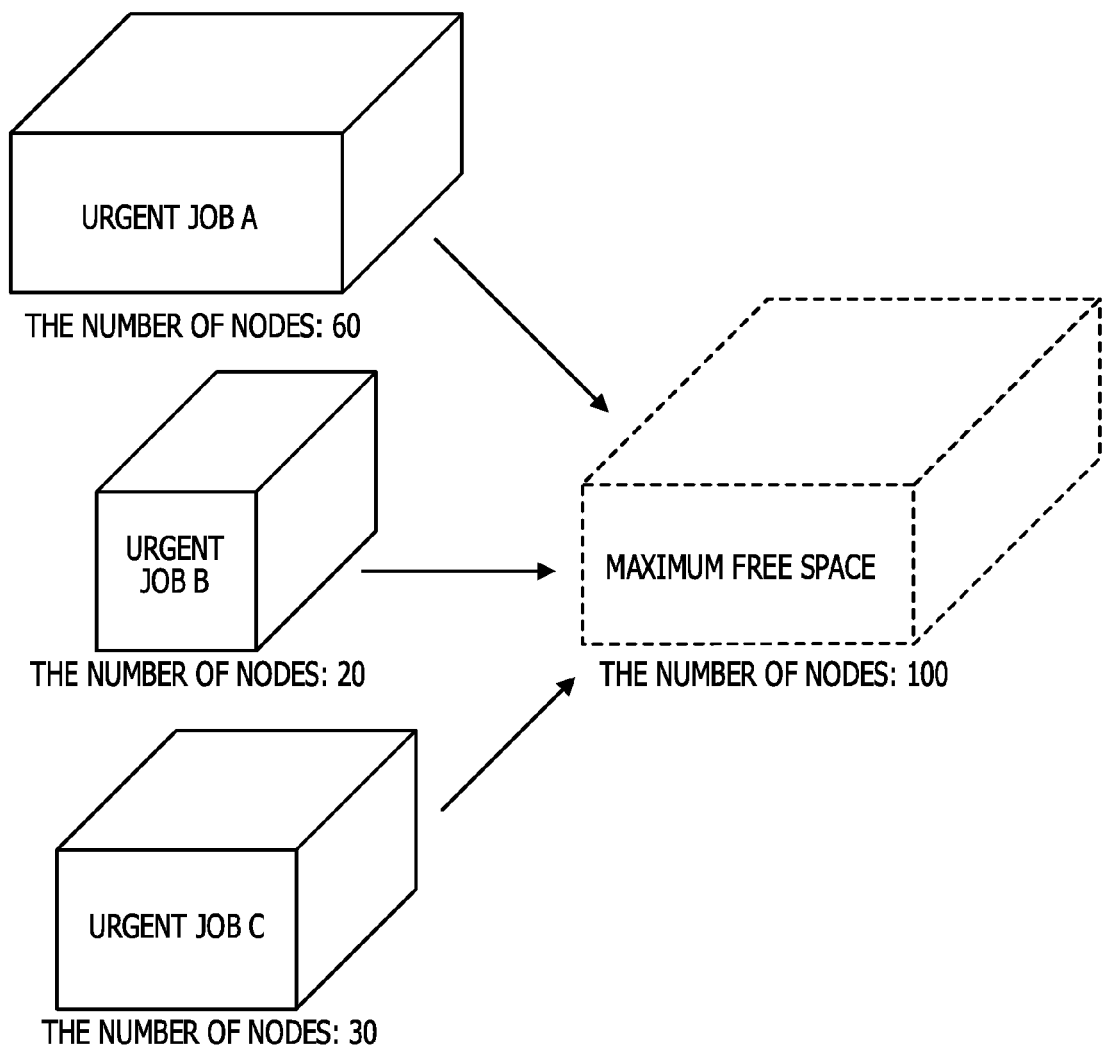
FIG. 13 is a diagram for explaining allocation of computation nodes to an urgent job.

For example, it is assumed that there are urgent jobs A to C as illustrated in FIG. 13. The number of computation nodes used for the urgent jobA is 60, the number of computation nodes used for the urgent jobB is 20, and the number of computation nodes used for the urgent jobC is 30. On the other hand, the number of computation nodes included in the maximum free space is 100.

Figure 14:
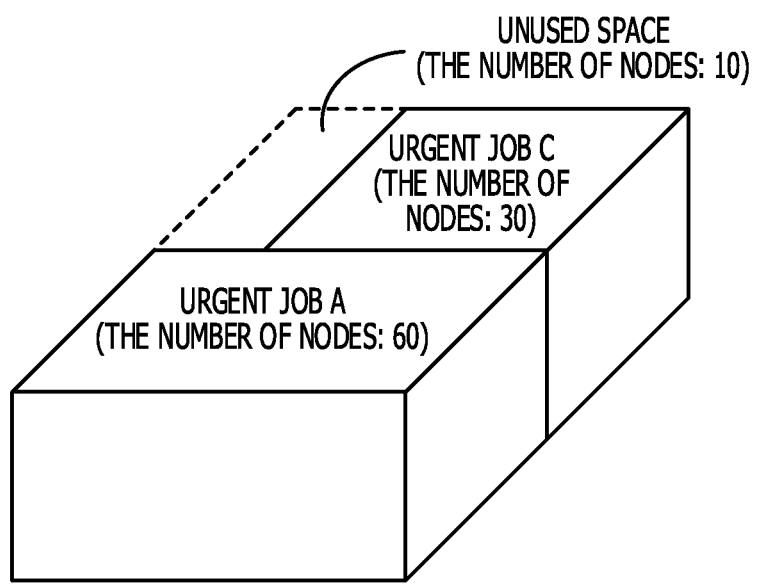
FIG. 14 is a diagram for explaining allocation of computation nodes to an urgent job.

In such a situation, if the processing according to the present embodiment is executed, for example, as illustrated in FIG. 14, the computation nodes included in the maximum free space are allocated to the urgent jobs. In the example in FIG. 14, the computation nodes included in the maximum free space are allocated to the urgent jobA and the urgent jobC, and the number of computation nodes included in the unused free space is 10. Accordingly, the urgent jobA and the urgent jobC are executed. For the urgent jobB, the number of available computation nodes is insufficient, and thus the urgent jobB is executed if the number of available computation nodes becomes 20, or empty nodes are obtained by the processing in step S47.

Figure 15:
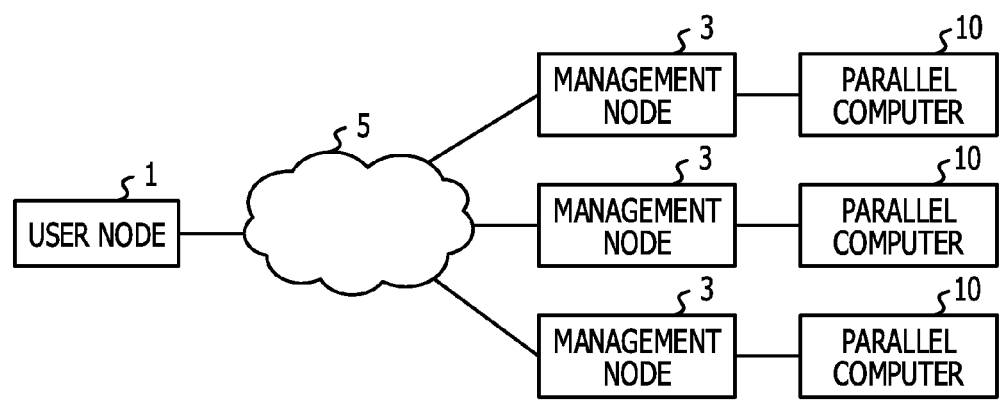
FIG. 15 is a diagram for explaining the case where there are a plurality of parallel computers.

In this regard, an example in which the user node 1 is allowed to use one parallel computer 10 has been described. However, the user node 1 may be allowed to use a plurality of parallel computers 10 as illustrated in FIG. 15. In the example in FIG. 15, the user node 1 is allowed to use three parallel computers 10. In this case, the user node 1 makes an inquiry to each of the plurality of management nodes 3, and causes a parallel computer 10 that is allowed to process the largest number of urgent jobs to execute the processing. Also, urgent jobs may be executed by the plurality of parallel computers 10.

As described above, a description has been given of an embodiment of the present disclosure. However, the present disclosure is not limited to this. For example, there are cases where the above-described functional block configuration of the user node 1 and the management node 3 do not match the actual program module configurations, respectively.

Also, the structure of each table described above is an example, and the above-described configuration does not have to be employed. Further, in the processing flowchart, it is possible to change the orders of the processing as long as the processing result is not changed. Further, the processing may be executed in parallel.

Also, each of the flows is an example, and another selection method may be employed if it is possible to select the most suitable combination.

Figure 16:
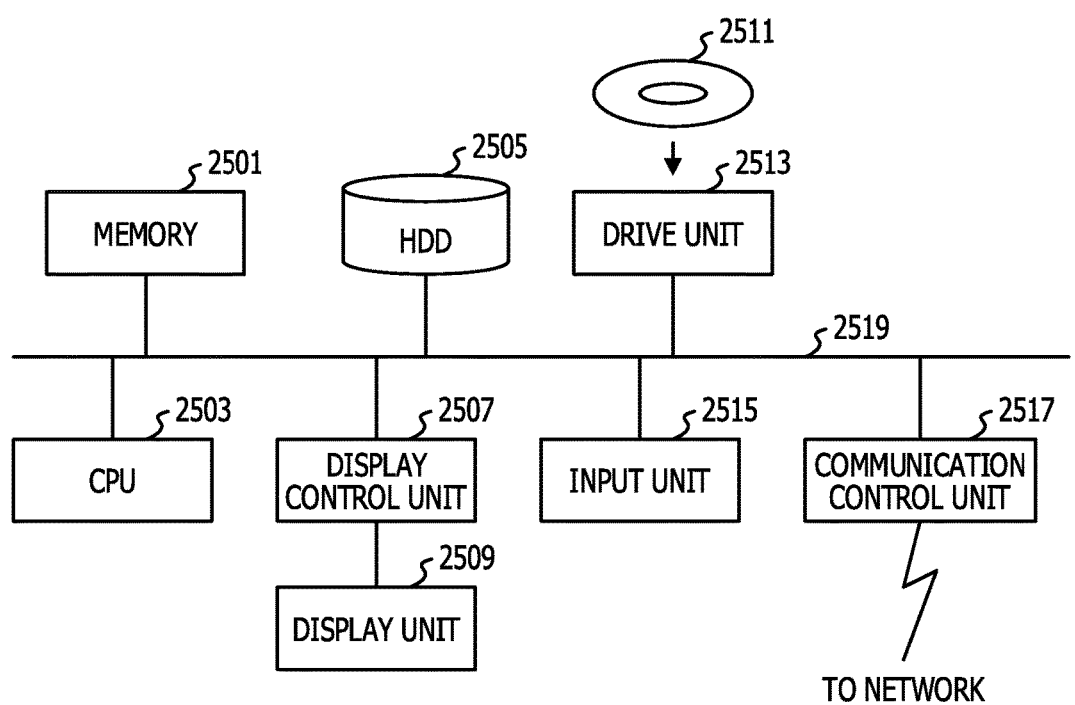
FIG. 16 is a functional block diagram of a computer.

In this regard, the above-described user node 1, management nodes 3, and computation nodes are computer apparatuses. As illustrated in FIG. 16, the computer apparatus has a configuration in which a memory 2501, a central processing unit (CPU) 2503, a hard disk drive (HDD) 2505, a display control unit 2507, which is coupled to a display device 2509, a drive unit 2513 for a removable disc 2511, an input device 2515, and a communication control unit 2517 for coupling to a network are coupled to a bus 2519. An operating system (OS), and an application program for achieving the processing in the embodiment are stored in the HDD 2505, and when executed by the CPU 2503, the OS and the application program are loaded from the HDD 2505 to the memory 2501. The CPU 2503 controls the display control unit 2507, the communication control unit 2517, and the drive unit 2513 in accordance with the processing contents of the application program to perform predetermined operation. Also, data in process of being processed is mainly stored in the memory 2501, but may be stored in the HDD 2505. In an embodiment according to the present disclosure, the application program for performing the above-described processing is stored in a computer-readable removable disc 2511, and is distributed. Then, the application program is installed in the HDD 2505 from the drive unit 2513. The application program is sometimes installed in the HDD 2505 through a network, such as the Internet, or the like, and the communication control unit 2517. Such a computer apparatus achieves the various functions described above by organized cooperation of the above-described hardware, such as the CPU 2503, the memory 2501, and the like, and the programs, such as the OS, the application program, and the like.

However, the computation node may be a CPU or a CPU core.

The summary of the above-described embodiment according to the present disclosure is as follows.

According to an embodiment of the present disclosure, there is provided an information processing system including: (A) a plurality of information processing apparatuses; (B) a management apparatus configured to manage execution of jobs by the plurality of information processing apparatuses; and (C) a terminal apparatus. Then, the above-described management apparatus includes (b1) a first processing unit configured to identify an information processing apparatus that is not executing a job among the plurality of information processing apparatuses, and transmit information on the number of identified information processing apparatuses to the terminal apparatus, and (b2) upon receiving identification information of at least one job to be executed by an information processing apparatus not executing a job, a second processing unit configured to perform scheduling so as to cause an information processing apparatus that is not executing a job to execute the job.

In this manner, it is possible to execute suitable jobs in accordance with the number of computation nodes that are not executing a job, and thus it becomes possible to effectively utilize surplus computational resources.

Also, the above-described first processing unit may (b11) identify a cuboid space from spaces occupied by the information processing apparatuses not executing a job, and transmit information on the number of information processing apparatuses included in the identified cuboid space. If the information processing apparatuses executing jobs are discrete, at a time when communication is performed among the plurality of information processing apparatuses, a communication processing load sometimes occurs on an information processing apparatus that is not executing a job. Accordingly, by performing processing as described above, a communication load does not occur in the information processing apparatus that is not executing a job, and thus it is possible to avoid a decrease in the processing performance.

Also, (b12) out of spaces occupied by the information processing apparatuses not executing a job, the above-described first processing unit may identify a cuboid space having a maximum volume in the cuboid space. In this manner, it becomes possible to utilize the computational resources of the information processing apparatus as efficiently as possible.

Also, the above-described terminal apparatus may include (c1) a reception unit configured to receive information on the number of information processing apparatuses that are not executing a job among the plurality of information processing apparatuses from the management apparatus, (c2) an identification unit configured to identify at least one job to be executed by the information processing apparatus that is not executing a job among jobs to be executed based on the number of information processing apparatuses that are executing a job, and the number of information processing apparatuses to be used for each of the plurality of jobs to be executed, and (c3) a transmission unit configured to transmit identification information of the identified job to the management apparatus. In this manner, it becomes possible to execute suitable jobs in accordance with the number computation nodes that are not executing a job.

Also, the above-described identification unit may (c21) identify at least one job such that a value produced by dividing a total number of information processing apparatuses to be used for a job by the number of information processing apparatuses not executing a job becomes a maximum. In this manner, it becomes possible to utilize the computational resources of the information processing apparatus as efficiently as possible.

Also, the above-described transmission unit may (c31) transmit a stop request to the management apparatus for stopping at least some jobs being executed in the plurality of information processing apparatuses when there are no jobs to be executed by the information processing apparatuses not executing a job. In this manner, it becomes possible to execute a job to be executed using released computational resources of the information processing apparatuses.

According to an embodiment of the present disclosure, there is provided a method of controlling an information processing system including a plurality of information processing apparatuses, a management apparatus configured to manage the plurality of information processing apparatuses, and a terminal apparatus. The above-described management apparatus includes (D) processing for identifying an information processing apparatus that is not executing a job among the plurality of information processing apparatuses, and transmitting information on the number of identified information processing apparatuses to the terminal apparatus, and (E) upon receiving, from the terminal apparatus, identification information of at least one job to be executed by an information processing apparatus that is not executing a job, performing scheduling to cause the information processing apparatus that is not executing a job to execute the job.

In this regard, it is possible to create a program for causing a computer to perform processing using the above-described method. The program is stored on a computer-readable storage medium, for example, a flexible disk, a CD-ROM, a magneto-optical disc, a semiconductor memory, a hard disk, and the like, or a storage device. In this regard, an intermediate processing result is temporarily stored in a storage device such as a main memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of information processing apparatuses;
a management apparatus including a first processor, and configured to manage execution of jobs by the plurality of information processing apparatuses; and
a terminal apparatus coupled to the management apparatus and including a second processor;
wherein the information processing system performs steps to:
transmit, by the second processor, an inquiry for the amount of emptiness of the plurality of information processing apparatuses to the management apparatus, the inquiry including a number indicating a number of dimensions for execution of a plurality of urgent jobs, wherein the inquiry includes a requested number of dimensions that are empty within the plurality of information processing apparatuses;
when the inquiry is received from the second processor, determine, by the first processor, whether one or more information processing apparatuses are available to execute a job among the plurality of information processing apparatuses, by referring to free space information in which coordinates of an origin in a free space and sizes in directions of individual coordinate axes are associated with each other for each of a plurality of free spaces, the plurality of free spaces respectively indicating a free resource for a job;
determine, by the first processor, whether the number of dimensions included in the inquiry is two or more, when determining one or more information processing apparatuses are available for executing the job;
if the inquiry does not include the two or more dimensions, then determine a number of empty nodes;
calculate, by the first processor, a maximum free space having a maximum volume among the plurality of free spaces included in the free space information, when it is determined that the number of dimensions is two or more,
transmit, by the first processor, either the number of empty nodes or information of the calculated maximum free space to the terminal apparatus;
transmit, by the first processor, information on a number of the one or more information processing apparatuses of the maximum volume that are available to execute the job to the terminal apparatus, when it is determined that the number of dimensions is two or more;

select, by the second processor, at least one urgent job that is capable of executing by using the one or more information processing apparatuses that are available to execute the job, from among the plurality of urgent jobs, based on the maximum free space occupying the number of the one or more information processing apparatuses;

transmit, by the second processor, identification information of the selected at least one urgent job to the management apparatus;

receive, by the first processor, the identification information from the terminal apparatus;

perform, by the first processor, scheduling to execute the selected at least one urgent job; and execute the selected at least one urgent job by the information processing apparatuses within the maximum free space.

2. The information processing system according to claim 1, wherein the first processor is configured to:

extract a cuboid space from a space occupied by the one or more information processing apparatuses that are available to execute a job, and transmit information on the number of the one or more information processing apparatuses included in the extracted cuboid space to the terminal apparatus.

3. The information processing system according to claim 2, wherein the first processor is configured to extract the cuboid space having a maximum volume in the cuboid space out of the space occupied by the one or more information processing apparatuses that are available to execute a job.

4. The information processing system according to claim 1, wherein the second processor is configured to select at least one job such that a value obtained by dividing a total number of information processing apparatuses to be used for the at least one job by the number of the one or more information processing apparatuses that are available to execute a job becomes a maximum.

5. The information processing system according to claim 1, wherein the second processor is configured to transmit a stop request to the management apparatus, when there is no job to be executed by the one or more information processing apparatuses that are available to execute a job, the stop request for stopping at least one of the jobs being executed by the plurality of information processing apparatuses.

6. The information processing system according to claim 2, wherein the second processor is further configured to transmit an inquiry to inquire regarding the number of the one or more information processing apparatuses included in the extracted cuboid space.

7. The information processing system according to claim 5, wherein the first processor is further configured to:

receive the stop request from the terminal apparatus;

store a context of the at least one of jobs in a storage in the management apparatus; and restore the context to restart the at least one of jobs after an urgent job is completed.

8. The information processing system according to claim 1, wherein the inquiry includes a number of dimensions, and the first processor further comprises determining whether the number of dimensions is equal to or more than two, when determining that the one or more information processing apparatuses that are available to execute the job, and further wherein the transmitting of the information includes transmitting information on the number of the information processing apparatuses that are available to execute the job, when determining that the number of dimensions is not equal to or more than two.

9. The information processing system according to claim 1, wherein the first processor is configured to transmit data indicating that the one or more information processing apparatuses for the job do not exist, when determining that the one or more information processing apparatuses that are available to execute the job do not exist.

10. The information processing system according to claim 1, wherein the first processor is configured to transmit data indicating that there is not an empty computation node to the terminal apparatus, when determining that the one or more information processing apparatuses does not exist.

11. The information processing system according to claim 10, wherein the first processor is configured to stop at least some of jobs being executed in the plurality of information processing apparatuses, after the data is transmitted to the terminal apparatus.

12. The information processing system according to claim 1, wherein the second processor is configured to allocate computation nodes among the one or more information processing apparatuses to the urgent jobs, such that spaces formed by the computation nodes become cuboids when the number of dimensions is three.

13. A method of controlling an information processing system including a plurality of information processing apparatuses, a management apparatus that manages execution of jobs by the plurality of information processing apparatuses, and a terminal apparatus coupled to the management apparatus, the method comprising:

transmitting, by the terminal apparatus, an inquiry for the amount of emptiness of the plurality of information processing apparatuses to the management apparatus, the inquiry including a number indicating a number of dimensions for execution of a plurality of urgent jobs, wherein the inquiry includes a requested number of dimensions that are empty within of the plurality of information processing apparatuses;

determining, by the management apparatus, whether one or more information processing apparatuses are available to execute a job among the plurality of information processing apparatuses, by referring to free space information in which coordinates of an origin in a free space and sizes in directions of individual coordinate axes are associated with each other for each of a plurality of free spaces, the plurality of free spaces respectively indicating a free resource for a job;

determining whether the number of dimensions included in the inquiry is two or more, when determining one or more information processing apparatuses are available for executing the job;

if the inquiry does not include the two or more dimensions, then determining a number of empty nodes;

calculating, by the management apparatus, a maximum free space having a maximum volume among the plurality of free spaces included in the free space information, when it is determined that the number of dimensions is two or more;

transmitting either the number of empty nodes or information of the calculated maximum free space to the terminal apparatus;

transmitting information on a number of the one or more information processing apparatuses of the maximum volume that are available to execute the job to the terminal apparatus, when it is determined that the number of dimensions is two or more;

selecting, by the terminal apparatus, at least one urgent job that is capable of executing by using the one or more information processing apparatuses that are available to execute the job, from among the plurality of urgent jobs, based on the maximum free space occupying the number of the one or more information processing apparatuses; and transmitting identification information of the selected at least one urgent job to the management apparatus;

receiving, by the management apparatus, the identification information from the terminal apparatus;

performing scheduling to execute the selected at least one urgent job; and executing the selected at least one urgent job by the information processing apparatuses within the maximum free space.

14. The method according to claim 13, further comprising:

extracting a cuboid space from a space occupied by the one or more information processing apparatuses that are available to execute a job, wherein transmitting the information comprises transmitting information on the number of the information processing apparatuses included in the extracted cuboid space to the terminal apparatus.

15. The method according to claim 14, wherein the extracting the cuboid space comprises extracting the cuboid space having a maximum volume in the cuboid space out of the space occupied by the one or more information processing apparatuses that are available to execute a job.

16. The method according to claim 13, wherein the selecting comprises selecting the at least one job such that a value becomes a maximum, the value being obtained by dividing a total number of information processing apparatuses to be used for the at least one job by the number of the one or more information processing apparatuses that are available to execute a job.

17. The method according to claim 13, further comprising:

transmitting, by the terminal apparatus, a stop request for stopping at least one of the jobs being executed by the plurality of information processing apparatuses to the management apparatus, when there is no job to be executed by the one or more information processing apparatuses that are available to execute a job.

18. A non-transitory computer-readable recording medium storing a program that causes a processor included in a management apparatus that manages a plurality of information processing apparatuses to execute a process, the management apparatus being coupled to a terminal apparatus, the process comprising:

transmitting, by the terminal apparatus, an inquiry for the amount of emptiness of the plurality of information processing apparatuses to the management apparatus, the inquiry including a number indicating a number of dimensions for execution of a plurality of urgent jobs, wherein the inquiry includes a requested number of dimensions that are empty within of the plurality of information processing apparatuses;

when the inquiry is received from the terminal apparatus, determining, by the management apparatus, whether one or more information processing apparatuses are available to execute a job among the plurality of information processing apparatuses, by referring to free space information in which coordinates of an origin in a free space and sizes in directions of individual coordinate axes are associated with each other for each of a plurality of free spaces, the plurality of free spaces respectively indicating a free resource for a job;

determining whether the number of dimensions included in the inquiry is two or more, when determining one or more information processing apparatuses are available for executing the job;

if the inquiry does not include the two or more dimensions, then determining a number of empty nodes;

calculating a maximum free space having a maximum volume among the plurality of free spaces included in the free space information, when it is determined that the number of dimensions is two or more; transmitting either the number of empty nodes or information of the calculated maximum free space to the terminal apparatus;

transmitting information on a number of the one or more information processing apparatuses of the maximum volume that are available to execute the job to the terminal apparatus, when it is determined that the number of dimensions is two or more;

selecting, by the terminal apparatus, at least one urgent job that is capable of executing by using the one or more information processing apparatuses that are available to execute the job, from among the plurality of urgent jobs, based on the maximum free space occupying the number of the one or more information processing apparatuses;

transmitting identification information of the selected at least one urgent job to the management apparatus;

receiving, by the management apparatus, the identification information from the terminal apparatus;

performing scheduling to execute the selected at least one urgent job; and executing the selected at least one urgent job by the information processing apparatuses within the maximum free space.

19. The non-transitory computer-readable recording medium according to claim 18, the process further comprising:

extracting a cuboid space from a space occupied by the one or more information processing apparatuses that are available to execute a job, wherein transmitting the information comprises transmitting information on the number of the one or more information processing apparatuses included in the extracted cuboid space to the terminal apparatus.

20. The non-transitory computer-readable recording medium according to claim 19, wherein the extracting the cuboid space comprises extracting the cuboid space having a maximum volume in the cuboid space out of the space occupied by the one or more information processing apparatuses that are available to execute a job.

* * * * *